Patented Nov. 21, 1939

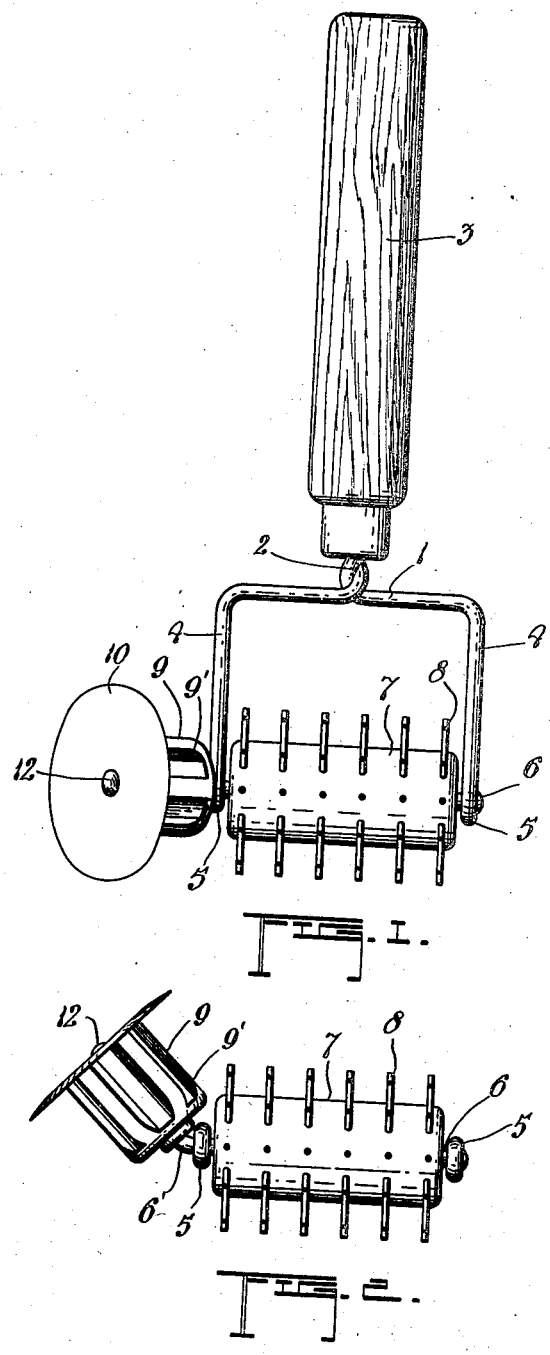

2,180,648

UNITED STATES PATENT OFFICE 2,180,648

KITCHEN UTENSIL

William E. Thompson, Winnipeg, Manitoba, Canada

Application August 22, 1938, Serial No. 226,182

2 Claims. (Cl. 107—49)

My invention relates to improvements in kitchen utensils for trimming and perforating pies and the like, a principal object of my invention being to provide a device of the character herewithin described which will enable one to perforate the surface of a pie in order to permit the escape of gases formed therein in cooking, and crimp and trim the edges thereof all in one operation.

A further object of my invention is to provide a device of the character herewithin described which may be economically manufactured and which is of a simple, sanitary construction, which may be easily cleaned and is not likely to become out of order.

With the above more important objects in view and such other minor objects as may appear as the specification proceeds, my invention consists essentially in the arrangement and construction of parts all as hereinafter more particularly described, reference being had to the accompanying drawing, in which:

Figure 1 is a plan view of my invention.

Figure 2 is a forward end view of the same.

In the drawing like characters of reference indicate corresponding parts in the different figures.

My invention consists essentially of a stiff wire frame 1, the central portion of which is twisted upon itself to form a rearwardly projecting shank 2, upon which is secured a handle 3. The ends of the wire frame 1 are angled outwardly and forwardly as is most clearly illustrated in Figure 1 of the accompanying drawing, to form a pair of forwardly projecting arms 4, which are spaced apart in parallel relationship.

The extremities of the arms 4 are end turned to form a pair of aligned eyelets 5 in which an axle 6 is secured, one end portion 6' of which projects outwardly past the adjacent eyelet 5 for a short distance and is angled obliquely to the main portion of said axle 6.

A roller or cylindrical block 7 is centrally drilled and rotatably mounted upon the axle 6 extending between the arms 4. In the surface of the roller 7, a plurality of radially projecting spikes 8 are secured at their lower ends, and are arranged in spaced relationship thereon.

Upon the outwardly projecting end portion 6' of the axle 6, a second roller 9 is rotatably mounted and is corrugated by a plurality of axially parallel recesses 9' formed in spaced relationship about the peripheral surface thereof. The roller 9 also has a trimming cutter, consisting of the sharp-edged circular disc 10, provided with a drill hole formed centrally therein, secured upon the outer end thereof, the assembly of the roller 9 and disc 10 being rotatably maintained upon the axle portion 6' by means of the flattened head 12 formed upon the extremity thereof.

My invention is operated by simply placing it upon the upper pastry layer of a pie with the disc 10 in contact with the edge of the pie plate. The device is then moved around the edge of the pie whereby it will be readily seen that simultaneously the disc 10 will trim off any excess pastry, the corrugated roller 9 will crimp the edge of the pastry and the spikes 8 upon the roller 7 will make perforations in the surface of said pastry.

In this manner I have provided a simple time saving device which performs simultaneously the aforementioned three operations which were formerly carried out separately.

Since various modifications can be made in the above invention, and many apparently widely different embodiments of same, made within the scope of the claims without departing from the spirit and scope thereof, it is intended that all matter contained in the accompanying specification shall be interpreted as illustrative only and not in a limiting sense and I desire only such limitations placed thereon as are specifically expressed in the accompanying claims.

What I claim as my invention is:

1. A kitchen utensil for trimming and perforating the pastry of pies and the like, comprising in combination, a frame, a handle secured upon the rearward end of said frame, the forward end of said frame consisting of a pair of spaced, forwardly projecting arms, an axle secured upon the forward ends of said arms, one end portion of said axle extending for a short distance beyond the adjacent arm and being angled obliquely to the main body portion thereof, a roller rotatably mounted upon said axle and between said arms, a plurality of spikes, said spikes being radially secured in even spaced relationship upon the peripheral surface of said roller and a second roller having a corrugated peripheral surface, said second roller being rotatably secured upon said end portion of said axle.

2. In combination with the device as defined in claim 1, a sharp edged circular disc, said disc being co-axially secured upon the outer end of said second roller, whereby said roller and said disc may rotate together upon said axle.

WILLIAM E. THOMPSON.